United States Patent [19]

Kobayashi et al.

[11] Patent Number: 5,550,626
[45] Date of Patent: Aug. 27, 1996

[54] IMAGE FORMING DEVICE FOR CREATING A COLOR IMAGE HAVING PIXEL ELEMENTS OF DIFFERENT THICKNESSES

[75] Inventors: Shinya Kobayashi, Mito; Toru Miyasaka; Kunio Satoh, both of Hitachi, all of Japan

[73] Assignee: Hitachi, Ltd., Tokyo, Japan

[21] Appl. No.: 177,991

[22] Filed: Jan. 6, 1994

[30] Foreign Application Priority Data

Jan. 12, 1993 [JP] Japan .................... 5-003103

[51] Int. Cl.⁶ .................................... G03G 15/01
[52] U.S. Cl. ............................ 355/326 R; 355/327
[58] Field of Search ........................ 355/326 R, 327, 355/245, 210

[56] References Cited

U.S. PATENT DOCUMENTS

| | | | |
|---|---|---|---|
| 4,731,634 | 8/1988 | Stark . | |
| 5,121,171 | 6/1992 | Knapp . | |
| 5,122,843 | 6/1992 | Yokoyama et al. | 355/326 R |
| 5,223,906 | 6/1993 | Harris | 355/326 R |
| 5,406,313 | 4/1995 | Noami et al. | 355/327 X |

FOREIGN PATENT DOCUMENTS

| | | |
|---|---|---|
| 181981 | 5/1986 | European Pat. Off. . |
| 488793 | 6/1992 | European Pat. Off. . |
| 582454 | 2/1994 | European Pat. Off. . |
| 60-185971 | 9/1985 | Japan . |
| 61-174565 | 8/1986 | Japan . |
| 61-223853 | 10/1986 | Japan . |
| 2-12273 | 1/1990 | Japan . |
| 2-105175 | 4/1990 | Japan . |

OTHER PUBLICATIONS

Knapp, John F. and Richard F. Koehler, "Tandem Trilevel Process Color Printer," *Xerox Disclosure Journal*, Nov. 1991, pp. 389–390.

Primary Examiner—Nestor R. Ramirez
Attorney, Agent, or Firm—Antonelli, Terry, Stout & Kraus

[57] ABSTRACT

An electrophotographic color printer exposes a photosensitive body to form an exposure pattern thereon. Toner material of two different colors is then applied to the exposure pattern by developers. The toner materials are subsequently transferred to a recording medium and fixed thereon. The toner materials are applied to the photosensitive body so that each of the two colors of toner materials have regions of two different thicknesses so they will have different thicknesses when applied to the recording medium. When two of the thicker regions are adjacent, the fixing of the toner materials will cause the toner materials of the two regions to mix. Thus, if the two adjacent thicker regions are of different colors, a third color will be produced. Toner material of further colors may also be transferred to the recording medium, by applying further toner materials to the same or another photosensitive body using further developers. The exposure pattern has a plurality of voltage levels having predetermined relationships to one another.

29 Claims, 8 Drawing Sheets

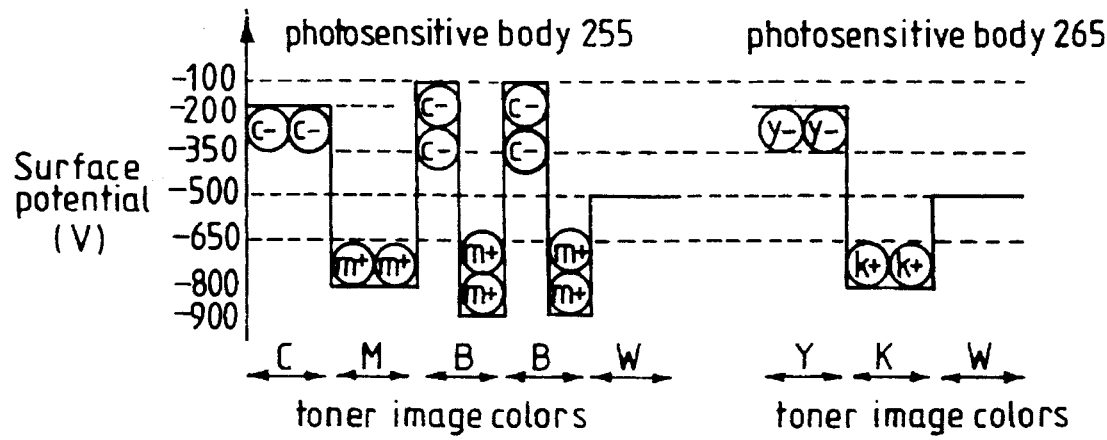
Fig.1(a) Photosensitive body surface potential
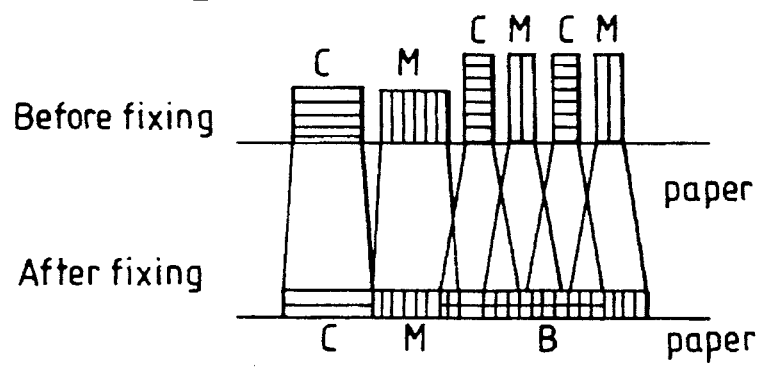
Fig.1(b) cross sectional shape of toner image
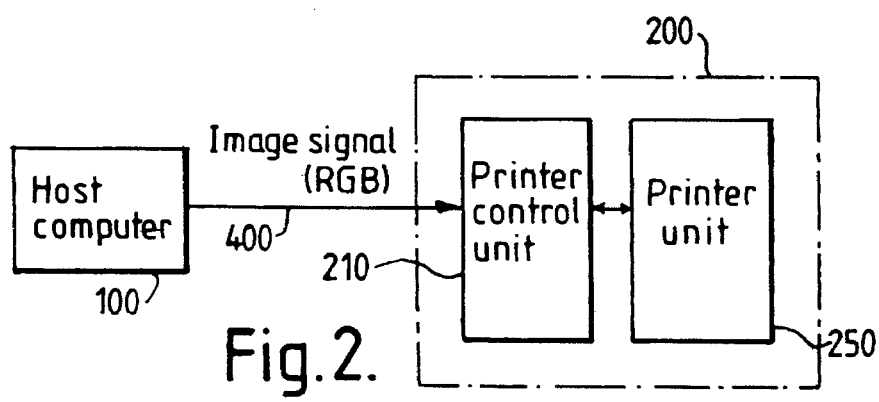
Fig.2.

Fig.3.
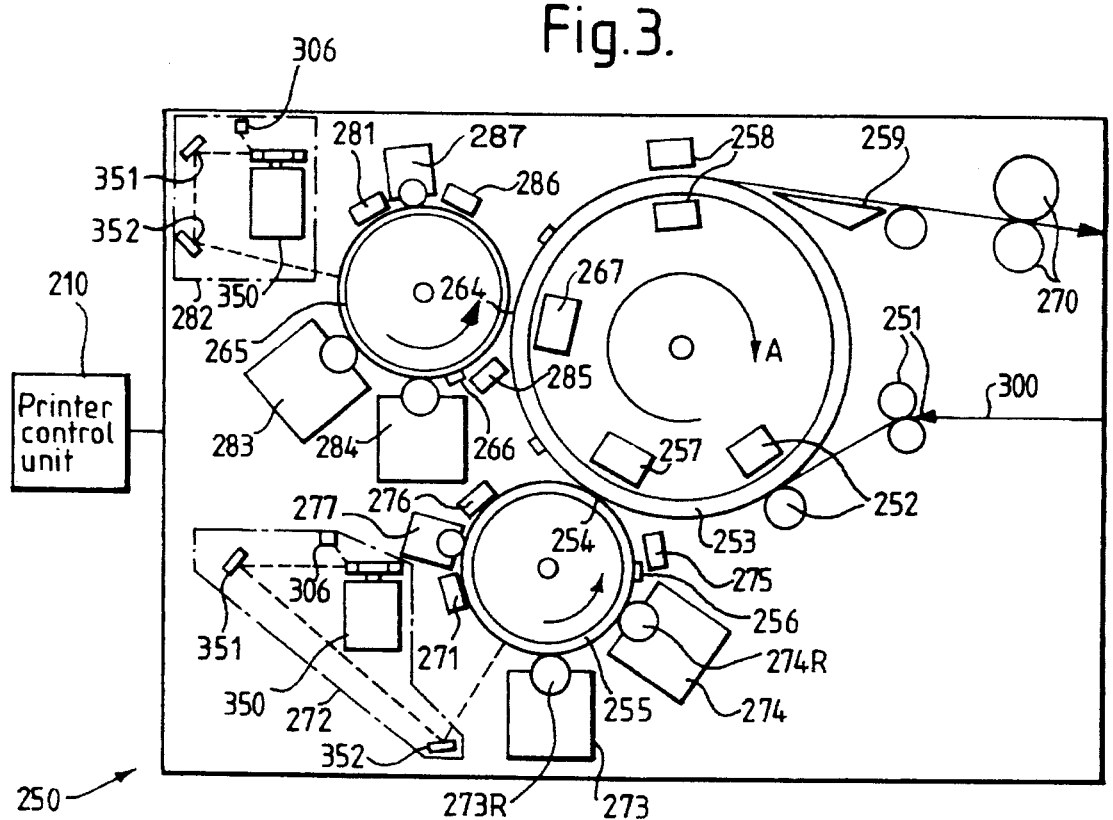
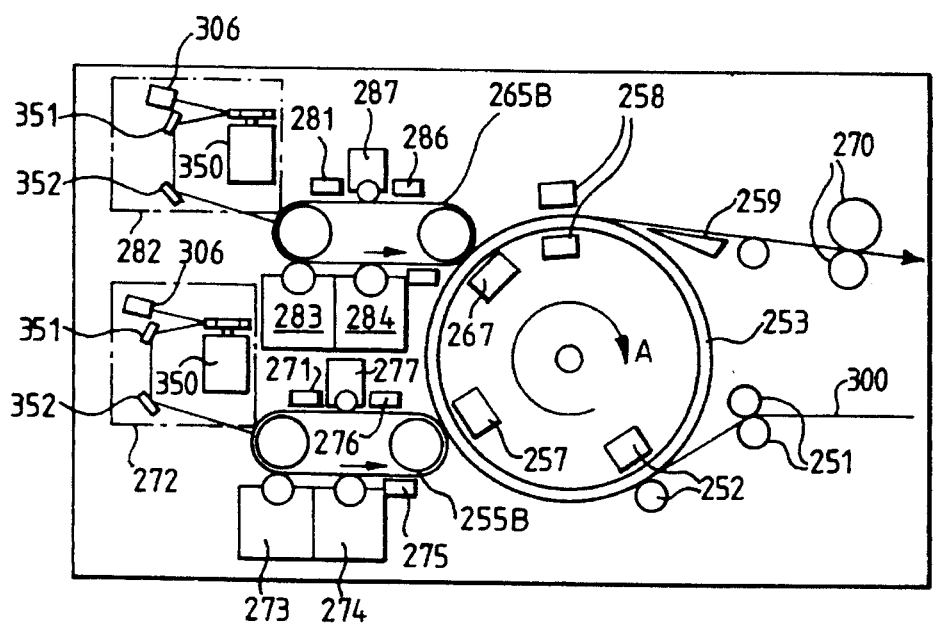
Fig.4.

IMAGE FORMING DEVICE FOR CREATING A COLOR IMAGE HAVING PIXEL ELEMENTS OF DIFFERENT THICKNESSES

BACKGROUND OF THE INVENTION

Field of the Invention

The present invention relates to an electrophotographic color printer. It is particularly, but not exclusively, concerned with an electrophotographic color printer capable of achieving full-color images. The present invention also relates to a method of printing using such a printer.

In a single-color electrophotographic printer, a latent image is formed on a photosensitive body by exposing that photosensitive body to a suitably modulated light beam, and then toner material of the color to be printed is applied to the photosensitive body, such that the pattern formed by the toner material corresponds to the latent image on the photosensitive body. This transferring step is also referred as developing the latent image. Subsequently, the toner material on the photosensitive body is transferred to a recording medium (for example, a sheet of paper), and is fixed thereto by a suitable fixing process (for example, heating the toner material to cause it to fuse).

In order to achieve full-color printing, four colors of toner materials are needed. These are cyan C, magenta M, yellow Y and black B. The first three of these (referred to as primary colors) are mixed to provide other colors. For example, magenta M and yellow Y together produce red R, yellow Y and cyan C produce green G, and cyan C and magenta M produce blue B.

In known full-color electrophotographic printers, for example as disclosed in JP-A-2-146065, the full-color image is produced by repeating for each color the steps that are carried out in single-color printing. Thus, for each of the four toner colors, the steps of exposing the photosensitive body, applying colored toner material to the photosensitive body and transferring the toner material image to a recording medium, had to be carried out sequentially. Such printing was slow, and also required precise alignment of the recording medium when the toner materials were each transferred, to ensure correct superposition of the primary color toner materials when it was desired to produce secondary colors.

Proposals have also been made for two-color electrophotographic printing, requiring only a single exposure step for the two colors. In U.S. Pat. No. 4,078,929, there is disclosed a printing method in which a photosensitive body is exposed to three different voltage levels, corresponding to a background voltage level, a first voltage level which is positive relative to the background voltage level, and a second voltage level which is negative relative to the background level. Then, by suitably electrically charging toner materials of two different colors a toner material of one color is applied to the regions of the photosensitive body exposed to the first voltage level, and a toner material of the second color is applied to the regions of the photosensitive body corresponding to the second voltage level. Since only one exposure step is then needed printing of the two colors is relatively fast and alignment of the two colors is ensured.

A development of this technique is disclosed in U.S. Pat. No. 4,731,634, in which a latent image had regions of a third voltage level more negative than the second or background levels. Toner of a first color (black K) is then applied to the regions of the first voltage level, toner material of a second color (cyan C) is applied to the regions having either the second or the third voltage levels, and toner material of a third color (magenta M) is applied to the regions of the third voltage level, by suitably adjusting the bias levels of the means for applying the toner materials to the photosensitive body. Such an arrangement permitted a color image to be formed having black K regions, cyan C regions, and blue B regions where both cyan C and magenta M were transferred.

Finally, U.S. Pat. No. 4,903,048 disclosed simulated color imaging by making use of an optical addictive process. However, in order to produce good colors, a subtractive process must be used which superimposes color materials.

SUMMARY OF THE INVENTION

When toner material is applied to a photosensitive body, the resulting thickness of the toner material may be varied. However, when the toner material is transferred to a recording medium, and fixed thereto, the degree of saturation of color will vary only up to a predetermined thickness, with thicknesses above that predetermined level having no effect on color saturation. Therefore, in order to avoid waste of toner material, it is normal to apply the toner material to the photosensitive body to a thickness that will achieve saturation when the toner material is transferred to the recording medium and fixed. Therefore, in all of the known techniques discussed above, the thickness of the toner material is substantially uniform for all colors.

Also, toner material is applied to the photosensitive body, and hence transferred to the recording medium, in a multiplicity of dots known as pixels or pixel elements. When the toner material is fixed, there is some spreading of the toner material, as it partially liquifies, and thus the size of the pixels increases slightly. Normally, therefore, small gaps have been left between the pixels when the toner material or materials are first transferred to the photosensitive body. The increase in size of the pixels depends on the amount of toner.

The present invention derives from the realization that these two effects may be combined in multi-color printing. At its most general, and in a first aspect, the present invention proposes that two toner materials of different colors are transferred to a photosensitive body after a single exposure step, to form pixels having two different thicknesses for each of the two toner materials.

If this is done, there will be greater spreading of the toner material of those pixel elements for which the toner material has the greater thickness. Spreading will then result in merging of the toner material of adjacent pixels if both have the larger thickness. Thus, suppose cyan C and magenta M toner materials are used, and some of the cyan and magenta pixel elements have a first thickness corresponding to saturation without mixing with adjacent pixel elements, and others of both the cyan and magenta pixel elements have a greater thickness (e.g. a double thickness). Then, where such thicker cyan and magenta pixel elements are adjacent, the fixing process will cause the toner materials thereof to mix, resulting in a blue B color. Thus, the first aspect of the present invention enables pixel elements of two different colors to be formed, and also regions corresponding to the mixture of those two colors to be achieved. This is not possible in the approach taken in U.S. Pat. No. 4,078,929 discussed above, since the two colors are necessarily separate in that process. Nor is it possible in U.S. Pat. No. 4,731,634 discussed above, where it is possible only to produce separate colors, or mixtures of one of those colors with a third color.

The different thicknesses of the toner materials can be achieved by suitable variation in the voltage levels produced by the exposure of the photosensitive body, as will be discussed in more detail later.

Although it is possible for all the pixel elements to be of the same size, it is preferable that they are of two different sizes. The pixel elements which are to have thicker toner material are smaller (for example, half the width) where the toner material is to have a smaller thickness. When the toner material of adjacent pixel elements mixes, it will appreciated that the resulting toner region will be approximately double the original width of the pixel element, and therefore it is convenient if the pixel elements of smaller toner thickness have the same width at this double width region. In this way, regions of approximately the same width are obtained for each color.

As described above, the first aspect of the invention results in the mixing of toner materials of two different colors at selected adjacent pixels, to produce a third color. In order to produce full-color electrophotographic printing, it is then necessary to provide two further colors of toner materials. There are several ways that this can be done.

Firstly, the two further colors of toner material may be applied to a recording medium in a separate transfer step. Thus, the arrangement of a first aspect of the present invention is carried out, and the toner material is transferred to a suitable recording medium (e.g. paper). Then, a further photosensitive body is exposed to form another exposure pattern thereon and the two additional colors of toner materials are transferred thereto, using, e.g. the techniques disclosed in U.S. Pat. No. 4,078,929. Then, such toner materials may be transferred to the recording medium. In such an arrangement, it is possible for some of the region of one of the colors of toner material transferred from the second photosensitive body to overlie at least some of the regions of toner material transferred from the first photosensitive body. In this case, further colors will be generated when the toner materials are fixed. Thus, suppose that the toner materials applied to the first photosensitive body are cyan C and magenta M. Making use of the first aspect of the present invention, blue B regions can be produced by forming adjacent pixels of cyan and magenta toner material which are sufficiently thick that they will mix during fixing. The second photosensitive body then receives yellow Y and black K toner materials. If some of the yellow toner material is transferred to the recording medium so as to overlie the pixels of cyan toner material, then the color green G will be produced when the toner materials are fixed. Similarly, if yellow toner material overlies the pixels of magenta toner material, then the color red R will be produced. Where no toner material is transferred to the recording medium, the background color (white in the case of paper), will be produced. Hence, a full range of colors may be achieved.

The above arrangements made use of two photosensitive bodies. It is also possible to make use of the present invention in arrangements in which there is only one photosensitive body. In this case, however, the recording medium must pass the photosensitive body twice. Thus, the first exposure of the photosensitive bodies is carried out, and toner materials of first and second colors are applied thereto. By making use of the first aspect of the present invention, a third color can be achieved by providing adjacent pixels of the first and second toner materials with a thickness sufficient that they will mix when the toner materials are fused. Then, the photosensitive body is cleared of toner material, re-exposed, and toner materials of third and fourth colors are applied thereto, and subsequently transferred to the recording medium. The effect is then similar to the use of two photosensitive bodies.

In such an arrangement, using a single photosensitive body, it is possible to use only one exposure means, or it is possible to use two exposure means to generate the two different latent images needed.

In the former case, the two toner materials of the first latent image must be transferred prior to the formation of the second latent image. In the latter case, however, by suitable arrangement of the components, simultaneous transfer of all the toner materials can be achieved, thereby reducing the risk of misalignment of the colors. In this latter case, however, it is necessary for the second exposure to have different voltage levels from the first.

As was previously mentioned, the present invention may make use of voltage levels generated on the photosensitive body by suitable exposure. In accordance with a second aspect of the present invention, an exposure pattern is formed on the photosensitive body which has at least five voltage levels. In addition to a background voltage level, there is a first voltage level positive relative to the background, a second voltage level positive relative to both the first voltage level and the background, a third voltage level negative relative to the background, and a fourth voltage level negative relative to both the third and background levels. Toner material of the first color is then applied to the regions corresponding to the first and second voltage levels, and second toner material is applied to the regions with the third and fourth voltage levels.

Hence, the first and second voltage levels have the opposite polarity to the third and fourth voltage levels, relative to the background voltage level, and so the pixels of each toner material will be independent. However, the pixel regions corresponding to the second and fourth voltage levels will receive more toner material than the pixels corresponding to the first and third voltage levels, so that they can receive sufficient toner material to mix with adjacent pixels when the toner materials are fixed. As a result, a third color can be achieved by mixing of the first and second toner materials.

This second aspect of the present invention may be developed further, by using fifth and sixth voltage levels, which are respectively more positive, and more negative, than the second and fourth voltage levels. The first toner material, and a third toner material, may then be transferred to the regions corresponding to the fifth voltage level, and the second toner material and the third toner material may then be transferred to the regions corresponding to the sixth voltage level by providing both positively and negatively charged toner material of the third color. In this way, additional colors can be generated using a single exposure of the photosensitive body. Although this single exposure cannot result in a full-color process, because the pixels of the third color cannot be produced independently, printing can occur at high speed, because there is only one exposure needed, and the range of colors thus produced at such speeds is greater than can be achieved by known methods. Of course, by using an additional exposure step, this can be developed into full-color printing.

Other aspects of the present invention relate to the structure of the electrophotographic color printer. Many different arrangements are possible, based on the description above, involving one or two photosensitive bodies, one or two exposure means for exposing the photosensitive body or bodies, and an appropriate plurality of developer means which apply the different toner materials. Where a plurality of photosensitive bodies are used, the recording medium passes each photosensitive body once in the production of the final image. Where there is only one photosensitive body, it may be necessary to cause the recording medium to pass that photosensitive body more than once.

It should be noted that the present invention relates to both an electrophotographic printer incorporating the above aspects of the present invention, and also to methods of electrophotographic color printing incorporating the above aspects.

BRIEF DESCRIPTION OF THE DRAWINGS

Embodiments of the present invention will now be described in detail, by way of example, with reference to the accompanying drawings, in which:

FIGS. 1(a) and 1(b) are schematic diagrams showing the basic principals of the present invention, FIG. 1(a) showing a relationship between the surface potential of the photosensitive body or bodies and the colors of the toner materials, and FIG. 1(b) showing the cross-sectional shape of the toner materials;

FIG. 2 is a schematic diagram showing the overall configuration of embodiments of the present invention;

FIG. 3 is a schematic sectional view through a printer unit being forming a first embodiment of the present invention;

FIG. 4 is a schematic sectional view through a printer unit being forming a second embodiment of the present invention;

DETAILED DESCRIPTION

Figure 5:
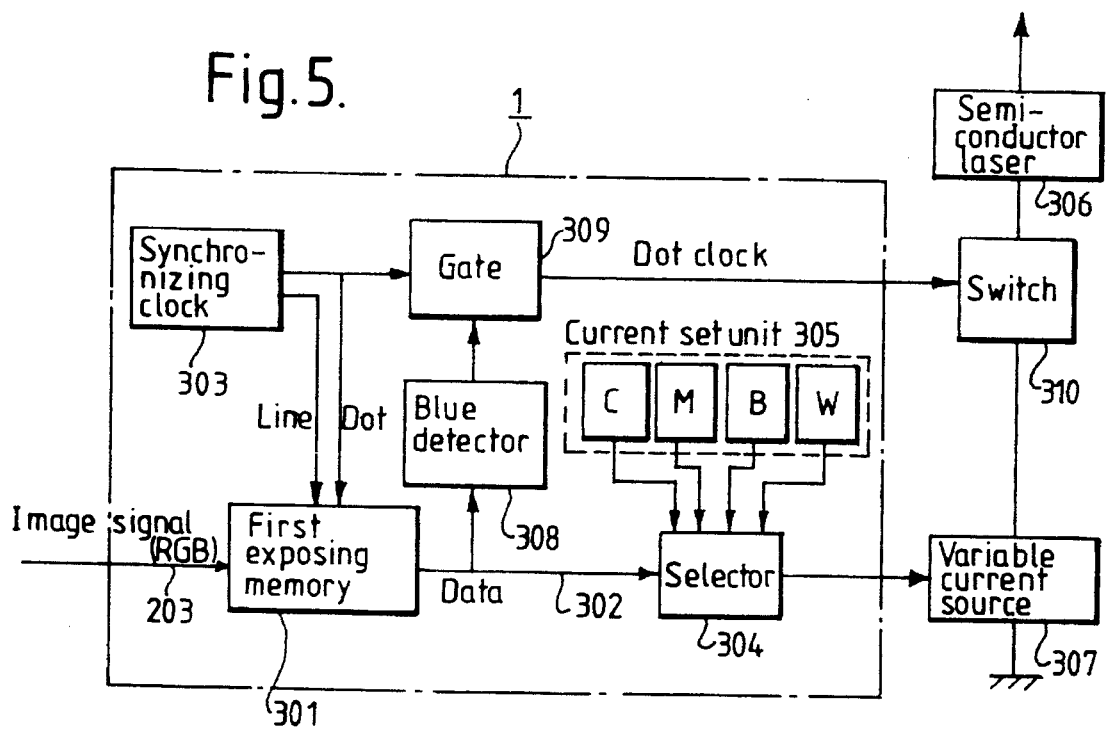
FIG. 5 is a schematic block diagram of a laser output control device for use in the first or second embodiment.

First, the principles underlying the present invention will be described.

As mentioned earlier, a known method of making a full-color image involves superimposing and developing one color at a time. In the method of this invention, on the other hand, the component colors are mixed, as shown in FIG. 1(b), to generate a third color. Hence, each area corresponding to one ordinary picture element or dot is divided into halves. In one half area, a first color toner (e.g. cyan) is applied in an amount greater than that which would normally be applied when only one color is to be produced. The remaining half area receives the same amount of a second toner (e.g. magenta). These toners adhering to the specified areas of a photosensitive body are then transferred to paper in larger-than-normal amounts, and are thermally fused and mixed together (subtractive color process) during the fixing process to produce a third color (e.g. blue).

Such color mixing occurs as follows. As shown in FIG. 1(a), when an electrostatic latent image is formed on the surface of a photosensitive body, the image exposure is controlled so that the potentials of the color mixing areas are set more positive (at −100 V) or more negative (at −900 V) than those potentials of areas where single colors are produced (−200 V and −800 V), with the potential (−500 V) of white areas taken as a background voltage. In other words, the exposure causes the surface of the photosensitive body to have two positive potential levels and two negative potential levels relative to the potential of the background voltage (white areas) where no toner is to be attached.

FIG. 2 shows a schematic diagram of a printing system according to this invention. In this system a full-color printer structure 200 receives image signals 400 representing each dot of an image from a host computer 100. The image signal 400 may take various forms according to the type of equipment. In this embodiment, the image signal has a total of three bits, one for each color. Thus, the image signal for each dot includes information representing one of eight colors, including red R, green G, blue B, cyan C, magenta M, yellow Y, and white W. Other colors are produced by a known artificial intermediate hue generation technique employed in the host computer 200.

Data sent to the full-color printer structure 200 enters a printer control unit 210, which generates control signals that control a printer unit 250.

FIG. 3 shows the overall configuration of a first embodiment of the printer unit 250 according to the present invention, for use in the full-color printer structure 200. First, the flow of recording medium will be discussed. The recording medium can be, for example, paper sheets, continuous paper, or OHP transparencies. In the subsequent description, it is assumed that the recording medium is in the form of paper sheets.

Paper 300 picked up from a paper hopper (not shown) is carried through guide rollers 251 onto a transfer drum 253, charged by a charger 252 and electrostatically attracted to the transfer drum 253. The transfer drum 253 revolves in the direction of the arrow A, so that the paper 300 passes a transfer point 254. At that transfer point 254, a first toner image 256 formed on a first photosensitive drum 255 is transferred onto the paper 300 by a transfer activator 257. The paper 300 then passes to another transfer point 264, at which a second toner image 266 formed on a second photosensitive drum 265 is transferred onto the paper 300 by a second transfer activator 267. Then, electrical charge is removed from the paper 300 by charge removers 258, the paper 300 is peeled off the transfer drum 253 by a separator claw 259, and then the paper 300 passes through fixing rollers 270 to fuse and fix the toner images 256, 266 on the paper 300 by applying heat and pressure.

The electrophotographic process carried out by the photosensitive drums 255 and 265 and their associated components will now be discussed. A charger 271, an exposing optical system 272, a first development processor 273, a second development processor 274, a charger 275, a charge remover 276, and a cleaner 277 are arranged around the first photosensitive drum 255. Similarly, a charger 281, an exposing optical system 282, a first development processor 283, a second development processor 284, a charger 285, a charge remover 286, and a cleaner 287 are arranged around the second photosensitive drum.

The photosensitive drums 255, 256 are charged uniformly by the chargers 271, 281 and then exposed by the exposing optical systems 272, 282, each made up of a semiconductor laser 306, a polygon mirror 350 and reflection mirrors 351, 352, which direct light beams onto the photosensitive drums with an intensity and width which are controlled according to the colors to be attached. Then, the exposed photosensitive drums are developed by the development processors 273, 283, 274, 284 to receive the associated color toner materials. The chargers 275, 285 recharge the toner images to polarities such that the toner materials will be attracted onto the paper 300. The recharged toner images are then transferred from the photosensitive drums to the recording paper 300 at the transfer points 254, 264. The positions of the transfer points where transfer takes place are accurately controlled and adjusted. After the transfer is completed, electrical charges are removed from the photosensitive drums 255, 265 by the charge removers 276, 286 and the drums are cleared of remaining toners by the cleaners 277, 287. The first recording process is then finished.

This embodiment uses a transfer body in the form of the transfer drum 253 and a photosensitive body in the form of the photosensitive drums 255, 265. It is also possible to form a part or all of these by using a transfer belt or photosensitive belt. These are controlled in accordance with the control signals from the printer control unit 210. Sensors (not shown) are provided which detect the conditions of these components and send appropriate signals to the printer control unit 210 for controlling the components of the printer.

The above construction increases the printing speed by four times relative to the conventional speed and also permits full-color printing with high precision.

FIG. 4 shows a second embodiment of a printer unit according to the present invention, which employs photosensitive belts 255B, 265B in place of the photosensitive drums 255, 265 of FIG. 3. This construction is generally similar to that of FIG. 3, and corresponding components are indicated by the same reference numerals. However, in the embodiment of FIG. 4, drive wheels and follower wheels for the belts are needed, making the size of the equipment slightly larger than when the photosensitive drums are used. This construction, however, can offer almost the same image quality as in the case of photosensitive drums and can ensure an increased printing speed.

With reference to the following Table 1 and FIGS. 1, 5 and 6, the operation of a color printer according to the embodiments of FIG. 3 or FIG. 4, will now be described.

Figure 6:
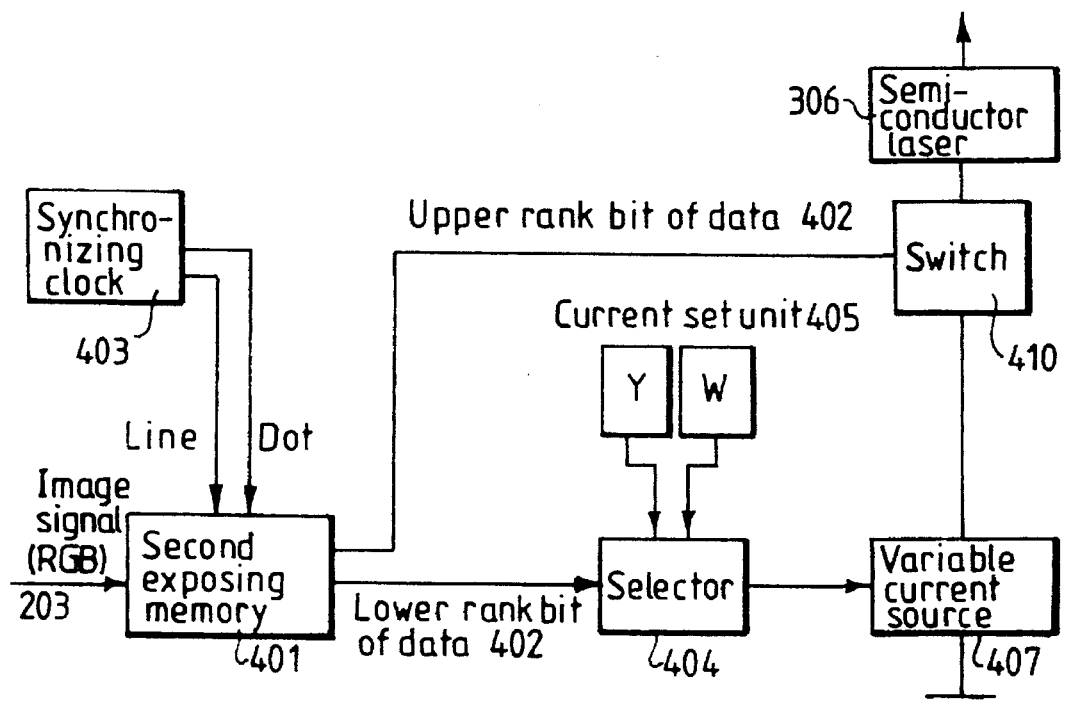
FIG. 6 is a schematic block diagram of another laser output control device for use in the first or second embodiments.

FIG. 5 and FIG. 6 show the details of a laser output control device that controls the optical systems and the development processors. FIG. 5 represents a laser output control unit for the exposing optical system 272 of FIG. 3. FIG. 6 represents a laser output control unit for the exposing optical system 282 of FIG. 3. Although shown here as separate control units, for ease of understanding, these two control units may be formed as a common unit except that separate memories are used. It is also possible for them to be separate, as shown. In FIG. 5, the image signals 203 received from the host computer 100 are divided by a simple logic circuit (not shown) and stored in a first exposure memory 301 (FIG. 5) and a second exposure memory 401 (FIG. 6). The memories 301, 401 use two bits for each dot.

The Photosensitive drums 255, 265 (or photosensitive belts 255B, 265B in the embodiment of FIG. 4) are charged uniformly (to −900 V) by the chargers 271, 281. In exposing the charged photosensitive body, the first exposure memory 301 feeds the data 302 to a selector 304 in synchronism with a synchronizing clock 303 for dots and lines during the recording process. The selector 304 has an exposing current setting unit 305 set to exposing current values corresponding to four colors, namely cyan C, magenta M, blue B and white W. A feedback control is performed to control automatically the amount of light emitted from the semiconductor laser 306 to specific constant values. The target value of the light intensity from the semiconductor laser 306 for each color will be described later. The selector 304 outputs a value corresponding to the data 302 to a variable current source 307. The variable current source 307 includes a digital-to-analog convertor and transistors, and supplies a current corresponding to the data 302 to the semiconductor laser 306.

When, during recording, the data 302 output from the memory 301 is "3" representing blue B, a blue sensor 308 opens a gate 309 allowing the synchronizing dot clock 303 to drive a switch 310 which in turn causes exposure to occur so that the amount of charge will be maximum. Because the synchronizing dot clock 303 has a 50% duty ratio, the semiconductor laser 306, which is driven when the blue sensor is operated, is turned off during the second half of the recording dot. That is, the second half of the recording dot is maintained at the minimum charge potential (−900 V). As an alternative, where the light beam is undulated digitally, the width of the spots of the light beam on the photosensitive body can be reduced for those half dots where a greater thickness of toner material is to be applied.

The second exposure memory 401 shown in FIG. 6 is similar in configuration to the first exposure memory 301 of FIG. 5 except that it has no blue sensor 308. A lower-order bit of the data 402 from the exposure memory 401 is output to the selector 404 in synchronism with the synchronizing clock 403 for dot and line. An exposing current value set by the exposing current setting unit 405 according to two colors, (namely yellow Y and white W) is output to the variable current source 407, which in turn applies the corresponding current to the semiconductor laser 306. A higher-order bit of the data 402 is fed as a black K signal to the switch 410 to turn it off.

To form a reflected image or transmitted image on white paper or transparent film using colored materials, at least three primary colors are needed. Generally, the widest gamut of colors (the range of colors produced) is obtained when cyan C, magenta M and yellow Y are selected as the three primary colors. In this embodiment, these three primary colors are used to provide full color printing. The embodiment of FIGS. 3 and 4 provides two exposure and development processes (using two sets of exposure and development devices). The first process (or first set) forms a toner image using cyan C, magenta M and blue B and the second process (or second set) forms a toner image using yellow Y and black K. The second toner image is transferred or overlaid on the first toner image (multiple transfer) without any positional deviation.

TABLE 1

| Image Signal (RGB) 203 | 010 | 011 | 100 | 101 | 001 | 110 | 000 | 111 |
|---|---|---|---|---|---|---|---|---|
| Colors of 1st toner image | C | C | M | M | B | W | W | W |
| Data 302 of 1st exposure memory 301 | 0 | 0 | 1 | 1 | 3 | 2 | 2 | 2 |
| Colors of 2nd toner image | Y | W | Y | W | W | Y | K | W |
| Data 402 of 2nd exposure memory 401 | 0 | 1 | 0 | 1 | 1 | 0 | 2 | 1 |
| Produced color after fixing | G | C | R | M | B | Y | K | W |

In the above table, the colors are identified as follows:

G: green, C: cyan, R: red, M: magenta, B: blue, Y: yellow, K: black, W: white

Table 1 shows the relationship between the input image signal 203, the color of the first toner image 256, the data 302 supplied to the first exposure memory 301, the color of the second toner image 266, the data 402 supplied to the second exposure memory 401, and the color produced after multiple transfer and fixing. 3-bit data such as "010" is fed from the host computer 100. Addresses in each memory that are preassigned particular colors are recorded with two bits which represent the order of development. The number indicated below the color represents the order in which the color is developed. By specifying the order of recording as shown in Table 1 (for example C, M, W and B), a color print is obtained which has eight colors after fixing.

FIG. 1 shows the surface potential of the photo-sensitive bodies 255, 265 exposed by the laser output control unit (FIG. 5 and 6) as well as the cross section of the developed toner images. A metal support drum inside the photosensitive layer of the photosensitive drums 255, 265 is grounded and forms a reference potential. The surface of the photosensitive drum 255 is charged evenly to −900 V by the charger 271 in a dark space. Next, the photosensitive drum 255 is exposed to one of the following four patterns according to the image signals by the exposing optical system 272 and the laser output control unit.

(i) Cyan C: The drum is exposed to a beam intensity Ec that will result in a surface potential of −200 V.

(ii) Magenta M: The drum is exposed to a beam intensity Em that will result in a surface potential of −800 V.

(iii) Blue B: The drum is exposed to a beam intensity Eb that will result in a surface potential of −100 V. It is noted, however, that since the semiconductor laser 307 is turned off in the second half of the recording dot, the potential of that second half falls to −900 V, as discussed earlier.

(iv) White W: The drum is exposed to beam intensity Ew that will result in a surface potential of −500 V, referred to as a background voltage.

Thus, the surface potentials for cyan C and blue B are positive relative to the background voltage for white W, and the surface potentials for magenta M and the reference potential are negative relative to the background voltage for white W.

Figure 7:
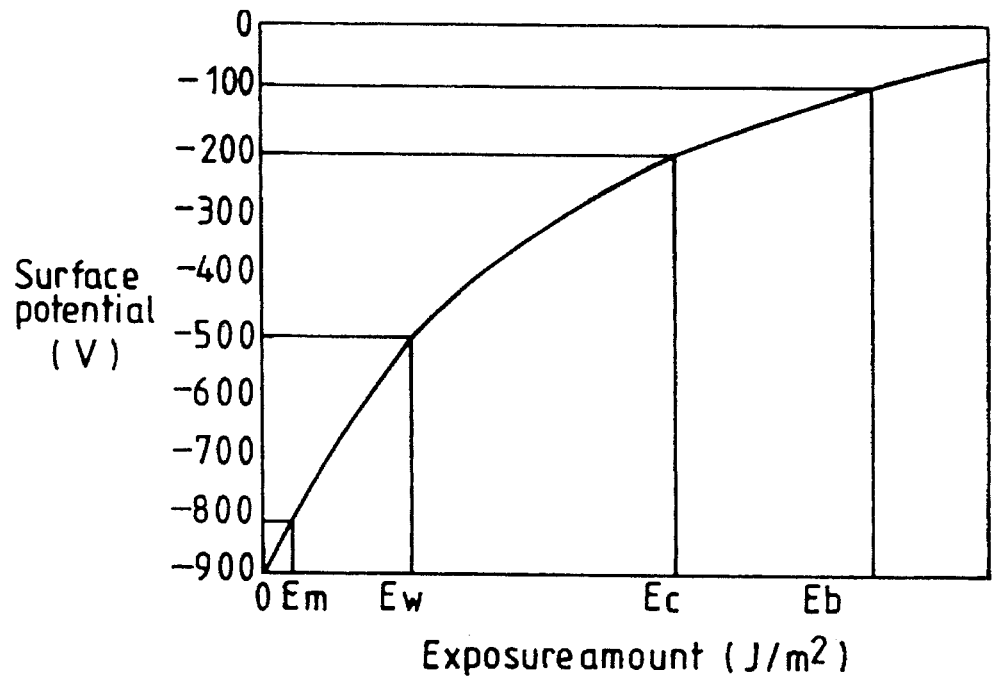
FIG. 7 is a graph showing the relationship between the surface potential of the photosensitive body and the amount of exposure of that photosensitive body, in embodiments of the present invention.

The relationship between the beam intensity E and the surface potential V (shown in FIG. 7) is determined in advance by experiments and optimum beam intensities are then chosen. The amounts of light from the semiconductor laser 306 that correspond to these beam intensities are determined from experiments and set in the laser output control unit (FIG. 5 and 6).

A development roll 273R of the first development processor 273 shown in FIG. 3 is set at a development bias voltage of −350 V. The development processor 273 contains a carrier and cyan toner material. The cyan toner material is negatively charged by friction with the carrier. For the areas with the surface potential of −200 V, to which cyan is to be applied, the development voltage with respect to the first development processor 273 is set to be 150 V; for the areas with the surface potential of −100 V where blue is to be applied, the development voltage is set to be 250 V; and for other areas the development voltage is set to be less than −150 V.

Figure 8:
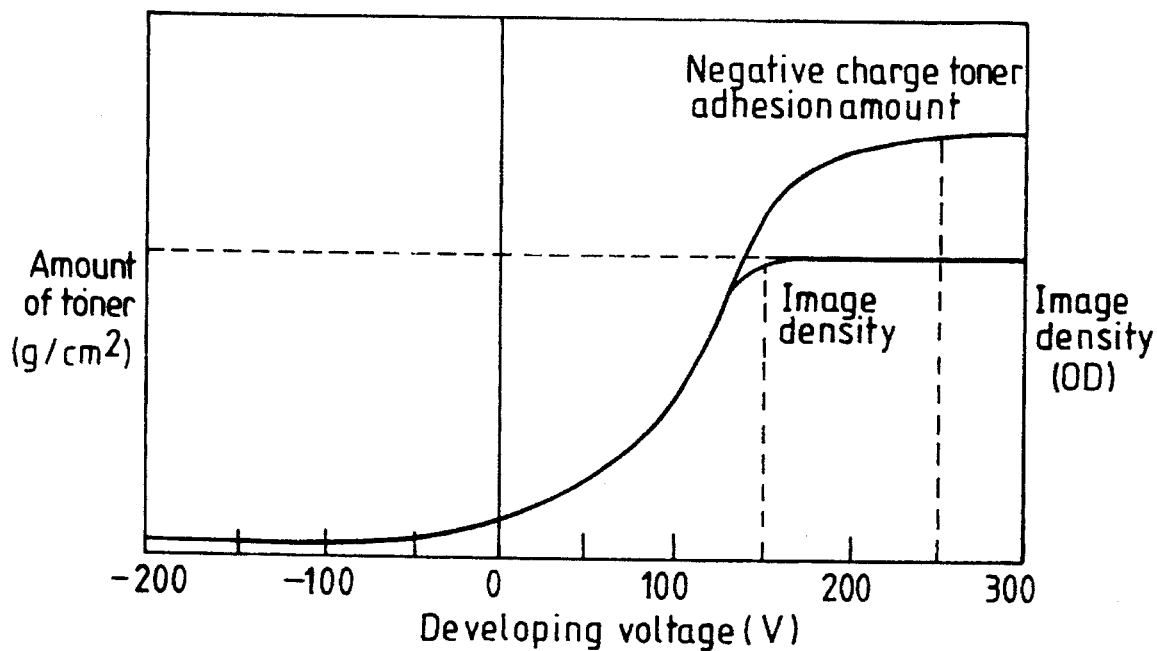
FIG. 8 is a graph showing the relationship between the amount of toner and the development voltage in embodiments of the present invention.

FIG. 8 shows the relationship between the development voltage, the amount of negatively charged toner material which is applied, and the image concentration or density. The amount of toner material increases with the development voltage up to 250 V but the image density becomes saturated at 150 V. Application of excess amounts of toner material will not only waste toner material but result in an offset during the fixing process, so that the optimal development voltage is around 150 V. Thus, while an appropriate amount of cyan toner is developed in areas where cyan is to be recorded, the left half of the area where blue is to be recorded receives an excess amount of the cyan toner material increasing the thickness of the toner material layer, as shown in FIG. 1(b). Cyan toner material is not applied to other areas with a development voltage of less than −150 V.

The development roll 274R of the second development processor 274 is set at a development bias voltage of −650 V. The development processor 274 contains a carrier and magenta toner material. The magenta toner material is positively charged by friction with the carrier. For the areas with a surface potential of −800 V, to which magenta is to be applied, the development voltage with respect to the second development processor 274 is set to be −150 V; for the areas with the surface potential of −900 V where blue is to be produced, the development voltage is set to be −250 V; and for other areas the development voltage is set to be more than 150 V.

The relationship between the development voltage, the amount of positively charged toner material transferred, and the image density has the characteristic shown in FIG. 8 but with the polarity of the development voltage reversed. Hence, while the appropriate amount of magenta toner material is transferred to areas where magenta is to be produced, the right half of the area where blue is to be recorded receives an excess amount of magenta toner material, increasing the thickness of the toner material layer, as shown in FIG. 1(b). Magenta toner material is not transferred to other areas with a development voltage of more than 150 V. Neither cyan toner material in the first development processor 273 nor magenta toner material in the second development processor 274 is applied to the areas with the surface potential of −500 V where white is to be produced, so that the area presents the white of the paper. The negative cyan toner material is positively charged by the charger 271.

The toner image 256 thus formed, having two colors (namely cyan and magenta), is electrostatically transferred at the transfer point 254 to the paper 300 by the transfer activator 257 of negative potential. Some of the toner material remains on the photosensitive drum, and electrical charge is removed from this residual toner material by the charge remover 276 and cleared by the cleaner 277.

In the same way as for the photosensitive drum 255, the photosensitive drum 265 is charged to −800 V at the surface by the charger 281. The area on the drum surface where yellow is to be produced is exposed so that the surface potential will be −200 V; the area where white is to be produced is exposed so that the surface potential will be −500 V; and the area where black is to be produced is not exposed, leaving the surface potential at −800 V. Negatively charged yellow toner material from the first development processor 283, whose bias potential is set to 350 V, is applied to the area where yellow is to be produced. Positively charged black toner material from the second development processor 284, whose bias potential is applied to the areas where black is to be produced. No toner sticks to the area where white is to be produced.

The toner image 266 thus formed of two colors (namely yellow and black), is transferred at the transfer point 264 onto the two-color toner image 256 composed of cyan and magenta which has already been formed on the paper 300. During this process, green and red are produced by transferring yellow toner material over cyan toner material and transferring yellow toner material over the magenta toner material, as shown in Table 1. At the last stage, the toner images 256 and 266 on the paper 300 are fused together and fixed to the paper by the fixing device 270 to produce colors as shown in Table 1. For the areas that are assigned to have a blue color, mixing of toner materials, a feature of this invention, occurs and will now be described.

During the fixing process, the lines of the toner material are pressed by rolls so that they widen slightly. The degree to which the toner material widens depends on the thickness of the toner material layer. Table 2 shows the changes in the toner material line width measured during the process from development to fixing.

TABLE 2

|  | After being developed (on photosensitive body) | After being transferred (on paper) | After being fixed (on paper) |
| --- | --- | --- | --- |
| Vertical line | 94μ | 98μ | 131μ |
| Horizontal line | 110μ | 99μ | 136μ |

This indicates that, after fixing, the vertical width of the toner material widens by 37 μm. Hence, as shown in FIG. 1(b), in areas where blue is to be produced, cyan and magenta are mixed by subtractive mixing to produce blue.

The embodiments of the invention discussed above provide two sets of exposure/development systems, which are operated in parallel. This increases the recording speed and allows the use of a continuous sheet of recording medium.

In the above configuration, two sets of exposure/development systems are used. When cut-sheet paper is used as the recording medium, however, it is possible to produce a full-color image with only one exposure/development system by temporarily winding the paper around the transfer drum 203.

Figure 9:
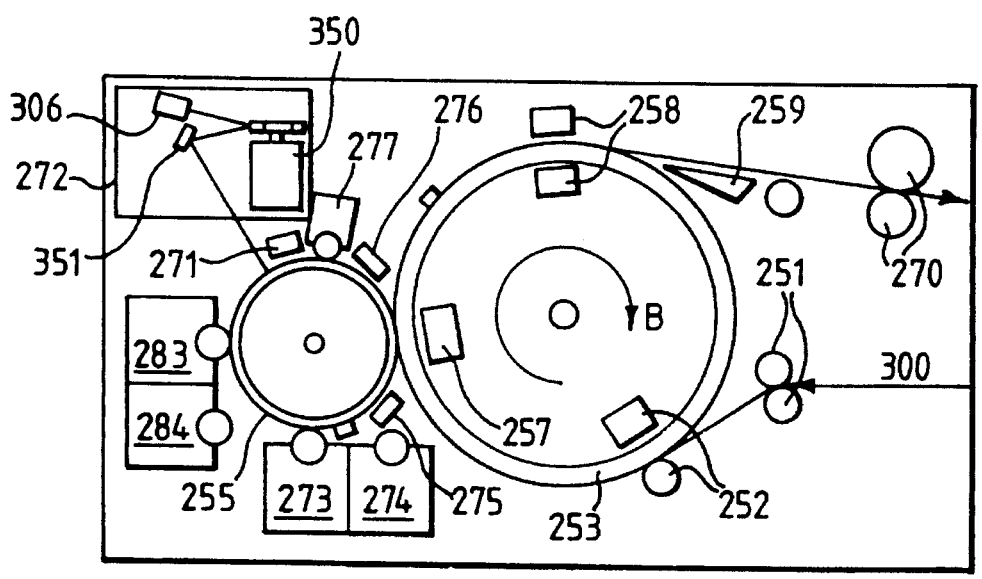
FIG. 9 is a schematic sectional view through a printer unit being forming a third embodiment of the present invention.
Figure 10:
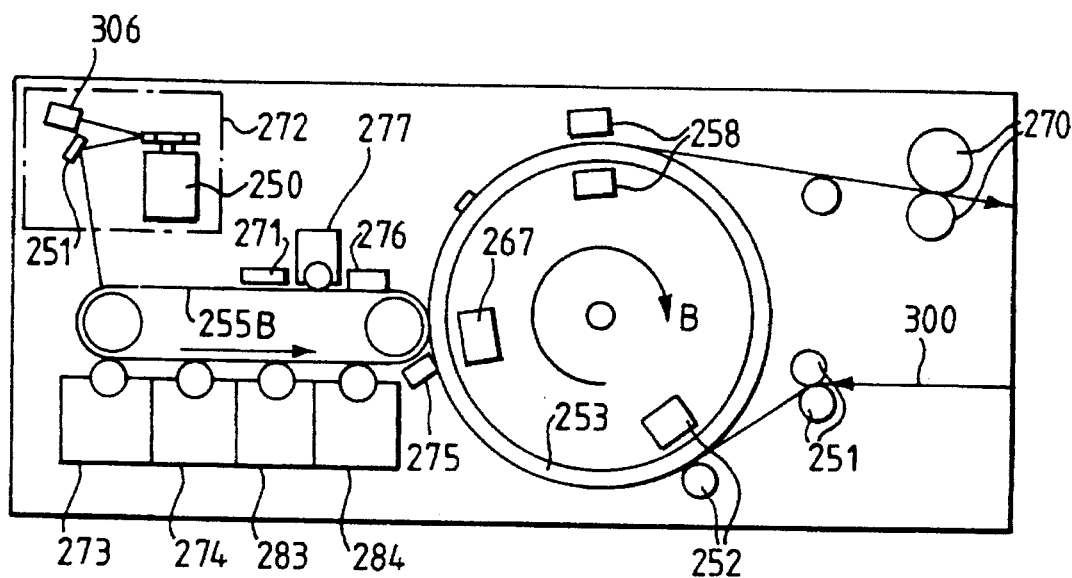
FIG. 10 is a schematic sectional view through a printer unit forming a fourth embodiment of the present invention.

FIG. 9 shows a photosensitive drum system and FIG. 10 a photosensitive belt system which make use of this arrangement. In the embodiment shown in FIG. 9, only one photosensitive drum is used and the charger, charge remover and cleaner are assembled into a unit, making the apparatus smaller.

In FIG. 9, components which correspond to components of the embodiment of FIG. 1 are indicated by the same reference numerals. In the construction of FIG. 9, the paper 300 is fed between the paper guides 251 to the transfer drum 253 and charged by the charger 252 so that the paper is electrostatically attracted to the transfer drum 253. The transfer drum 253 rotates in the direction of arrow B and a toner image formed on the photosensitive drum 255 is transferred by the transfer activator 257 to the paper 300 on the transfer drum 253. The photosensitive drum 255 is charged evenly over its photosensitive surface by the charger 271 and then exposed by a beam whose intensity is varied by the exposing optical system 272 in dependence on the kind of toner materials to be transferred. Next, colored toner materials are applied to the photosensitive body by the development processors 273, 283 to form a toner image, which is then transferred onto the paper 300 on the transfer drum 253 by the transfer activator 257. The paper to which toner material has been transferred remains attached to the transfer drum while making one revolution, after which further color toner material is transferred to the paper by the transfer activator. Then, electrical charge is removed from the paper by the charge remover 258, the paper is peeled off the transfer drum by the separator claw 259 and the developed toner image is fused and fixed by the fixing device 270, applying heat and pressure to the paper. The paper is then discharged from the equipment. During the fixing process, in areas where each dot has different color toner materials applied to dot halves, these toner materials (whose thicknesses are larger than the thickness of the ordinary dots) expand into adjacent areas of the toner materials as they are pressed, resulting in mixing of the toner materials.

After the toner materials of the first two colors is transferred, the photosensitive drum is freed of electrical charge by the charge remover 276 and cleared of remaining toner by the cleaner 277, after which an electrostatic latent image for the next color is formed on the photosensitive drum by the exposing optical system 272. The development processors 273, 283 are replaced with the development processors 274, 284, and the latent image is developed by the colored toner materials contained in these newly activated development processors. The developed image is transferred onto the recording paper by the transfer activator 257, as before. Changing the development processors may be accomplished, according to commands from a control apparatus, by mechanically moving the two development processors horizontally or vertically or by rotating integrally assembled development processors.

In the above system, since the transfer drum must be rotated twice and the development processors switched between the first and second run of the development process, special arrangements are needed to ensure precise positional alignment. Thus, it is necessary either to provide a sensor (not shown) to detect the position of the paper electrostatically wound around the transfer drum or to control the printer unit so that the toner image formed on the photosensitive drum has an exactly specified position on the transfer drum. This system, however, offers the advantages that, because only one photosensitive drum is used, replacement of the photosensitive drum is easy. Also, because the number of devices requiring fine adjustment (such as the exposing optical system) is reduced by half, maintenance becomes more simple.

FIG. 10 shows an embodiment in which a photosensitive belt 253B is used in place of the photosensitive drum 253 of FIG. 9. Other components of the embodiment of FIG. 10 are similar to corresponding components of the embodiment of FIG. 9 and are indicated by the same reference numerals. One advantage of the embodiment of FIG. 10 is that, because the four development processors 273, 274, 283, 284 can all be arranged along the photosensitive belt 253B, unlike the embodiment of FIG. 9, they do not need to be moved to be switched into use. The operation of this construction is nearly the same as that of FIG. 9 and detailed description of this is therefore is omitted.

Figure 11:
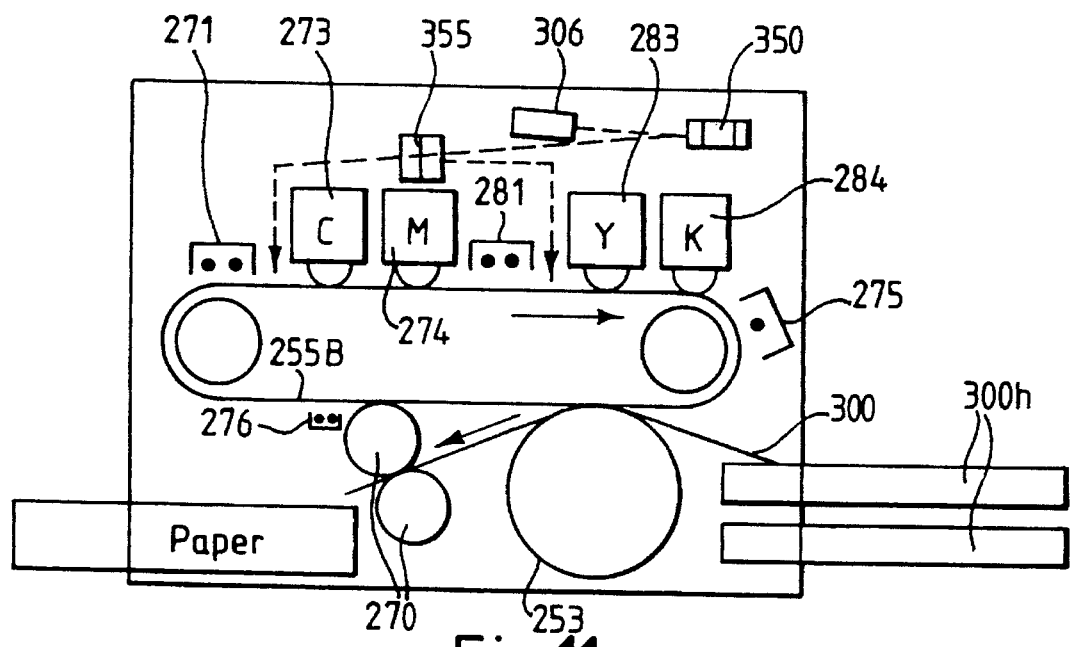
FIG. 11 is a schematic sectional view through a printer unit forming a fifth embodiment of the present invention.

FIG. 11 shows another embodiment of this invention. Components of this embodiment which correspond to the embodiment of FIG. 3 are indicated by the same reference numerals. The embodiment of FIG. 11 includes: four development processors 273, 274, 283, 284 arranged over one photosensitive belt 255B; an optical system which consists of a semiconductor laser 306, a polygon mirror 350 and a polarizer 355 and which exposes two locations at the same time using one light source; two chargers 271, 281; one recharger 275; one charge remover 276; one cleaner (not shown); a transfer drum 253; and a fixing device 270. The operation of this embodiment will now be described.

Upon receiving a record command and color information from the host computer, the printer picks up paper 300 from the paper hopper 300h and carries it to the transfer drum 253. This paper transport function is almost the same as that shown in FIG. 2 and hence detailed description thereof is omitted. The photosensitive body is the belt 255B in this embodiment but is not limited to this. A charger 271 is located upstream of the photosensitive belt 255B which uniformly charges the photosensitive belt 255B. The exposing device for exposing the photosensitive body surface charged by the charger 271 comprises a light source 306, a polygonal mirror 350 and a polarizer 355 that splits the light beam. The evenly charged photosensitive belt 255B is exposed to one of the split beams from the beam splitting means 355 of the exposing device, so that the photosensitive belt has a potential at which to develop the latent image with the toner materials of the development processors 273, 274. Then the photosensitive belt 255B is developed by the developers 273, 274. After passing the development processors 273, 274, the photosensitive belt is again charged uniformly by the charger 281 and is exposed by the other split beam to have a potential at which it is to be developed with the toner materials of the next development processors 283, 284. The photosensitive belt developed by the development processors 283, 284 is passed under the charge remover 275 to have a specified potential and the developed toner image is transferred at the transfer point to the paper 300 on the transfer roll 253. Though not shown, a transfer activator like the one shown in FIG. 3 is provided at this transfer point. The transferred toner image on the paper 300 is fixed by the fixing device 270, during which time the toner materials are mixed in the manner characteristic of this invention to produce desired colors. After the fixing, the photosensitive belt is cleared of remaining toner materials by the cleaner.

With the above construction, a full-color image is obtained in a single run of the exposure/development process, permitting high-speed recording and reduction in the equipment size.

Figure 12:
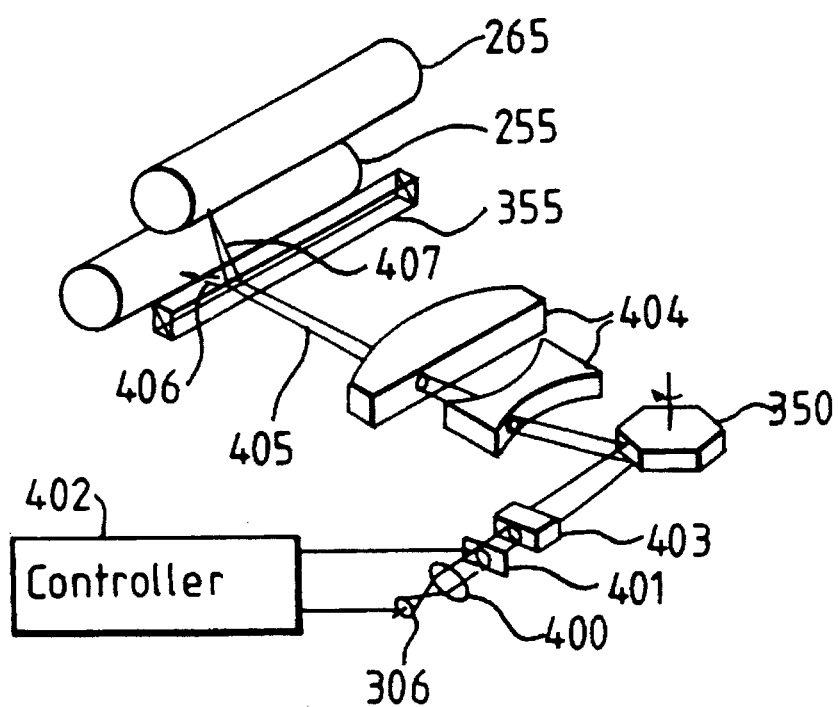
FIG. 12 is a schematic diagram of the optical system used in the embodiment of FIG. 11.

FIG. 11 shows schematically that a single laser is used to generate two light beams, using a polarizing beam splitter 355 to enable the photosensitive belt 255B to be exposed at two places, adjacent the chargers 271 and 281, respectively. In fact, beam splitting arrangements can be used in any embodiment of the present invention in which exposures are needed at two separate locations, and a way of achieving this will now be described in more detail, with reference to FIG. 12. FIG. 12 illustrates an arrangement in which a single laser 250 is used to expose two photosensitive drums 255 and 265 as in the embodiment of FIG. 3. However, it can be seen that this arrangement is also applicable to arrangements in which there are photosensitive belts, such as the embodiment of FIG. 4, or where a photosensitive belt or drum has to be exposed in separate locations, as in the embodiment of FIG. 11.

In the arrangement shown in FIG. 12, a light beam from a laser 306 is collimated by a collimator lens 400 and passes through a polarizing light switch 401. A controller 402 is connected to the laser 306 and light switch 401. This controller has two functions. Firstly, it controls the intensity of the light beam from the laser 306. Secondly, it varies the angle of polarization of the beam passing through the polarizing light switch 401. The effect of this will be discussed in more detail later. After the light beam has passed through the light switch 401, it passes through a cylindrical lens 403 and is incident on a polygon mirror 350. That polygon mirror reflects the light beam through an f-Θ lens 404 and the light is then incident on the polarizing beam splitter 355. The polarizing beam splitter 355 is arranged to pass light which is polarized in one direction, and to reflect light which is polarized in a perpendicular direction. Hence, the light beam 405 which is incident on the polarizing beam splitter 355 is split into two beams 406,407, which are incident on the photosensitive drums 255,265 respectively.

Thus, if the controller 402 controls the light switch 401 so that the light beam is polarized in the direction which is passed by the polarizing beam splitter 355, all the light from the laser 306 will be incident on the photosensitive drum 255. If the controller 402 controls the light switch 401 to polarize the beam in a perpendicular direction, then all of the light from the laser 306 will be reflected by the polarizing beam splitter 355 and will therefore be incident on the other photosensitive drum 265. If the light switch 401 is controlled by the controller 402 so that the direction of polarization is intermediate these two extremes, then some of the light in the beam 405 will pass to the first photosensitive drum 255 and the rest of the light will pass to the second photosensitive drum 265. By varying the intensity of light produced by the laser 306, and by varying the light switch 401, it is possible to ensure that the intensity of the light falling on either of the photosensitive drums 255,265 is at a suitable value for carrying out the present invention. Hence, each photosensitive drum 255,265 may be exposed such that dots for toner material receive different intensities and widths of exposure, to enable exposure in the manner shown in FIG. 1 to be achieved.

It should be noted that it is possible to split the light beam into two beams prior to it being incident on the polygon mirror 350. However, since the angles of reflection of such beams would then be different, a more complex optical arrangement is then needed to ensure that the two light beams are accurately focussed on the photosensitive drums 255,265 as the polygon mirror 350 rotates. In the arrangement shown in FIG. 12, only a single beam 405 passes through the f-Θ lens 404, and therefore that lens 404 can be designed in an optimum way.

Figure 13:
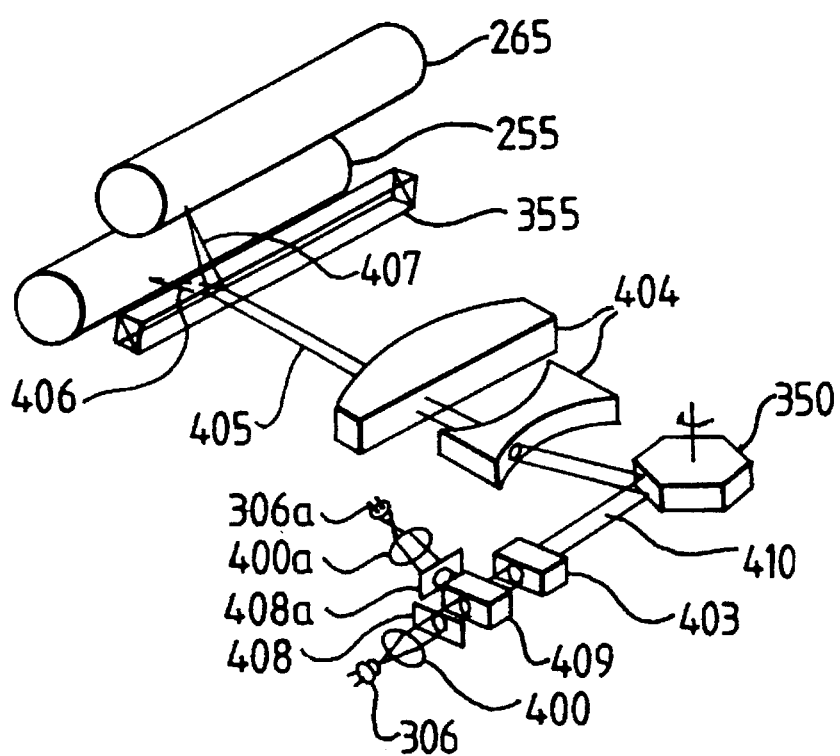
FIG. 13 is a schematic diagram of an alternative optical system for use in the embodiment of FIG. 11.

The polarized light switch 401 and its controller 402 are currently expensive. Therefore, another arrangement for achieving a similar effect may make use of two lasers 306,306A, as shown in FIG. 13. In the arrangement shown in FIG. 13, components which correspond to components of FIG. 12 are indicated by the same reference numerals. In the arrangement of FIG. 13, light from the laser 306 which has been collimated by the lens 400 passes through a polarizer 408 and passes through a light mixer 409. The light mixer 409 receives light from the second laser 306a, which has been collimated by a lens 400a and polarized by a polarizer 408a. The polarizers 408 and 408a are arranged such that the directions of polarization thereof are perpendicular. The light mixer 409 then mixes the two light beams to generate a single light beam 410 which is then incident on the polygon lens 350 and passes to the photosensitive drums 255,265 in the same way as in the arrangement of FIG. 12. By varying the intensity of the light from lasers 306,306a, the beam 410 may be arranged to have all its lights polarized in one or other perpendicular direction, or be composed of a mixture of light of the two polarizing directions. Hence, the intensities of the light in the beams 406,407 from the polarizing beam splitter 355 can be adjusted in the same way as in the arrangement of FIG. 12.

It can be noted that the polarizing beam splitter 355 can be replaced by a half-mirror and perpendicular polarizers if desired, with the same effects as in the arrangements for FIG. 12 or FIG. 13.

In the embodiments of the present invention described above, and indeed in the arrangements of FIGS. 12 and 13, it is necessary to vary the width of the light beam in order to vary the width of the dots formed on the photosensitive drums 255,256 to achieve the effect shown in FIG. 1. Such width variation is, in itself, known and its disclosed in e.g. the "Proceedings of the First Non-impact Printing Technologies Symposium—Color Hard Copy"84" which was held on 24 and 25 Jul. 1984. That disclosure illustrates the formation of oval light spots, in which the length of the minor axis of the ovals are varied. Such width variation may thus be used in the present invention.

Figure 14:
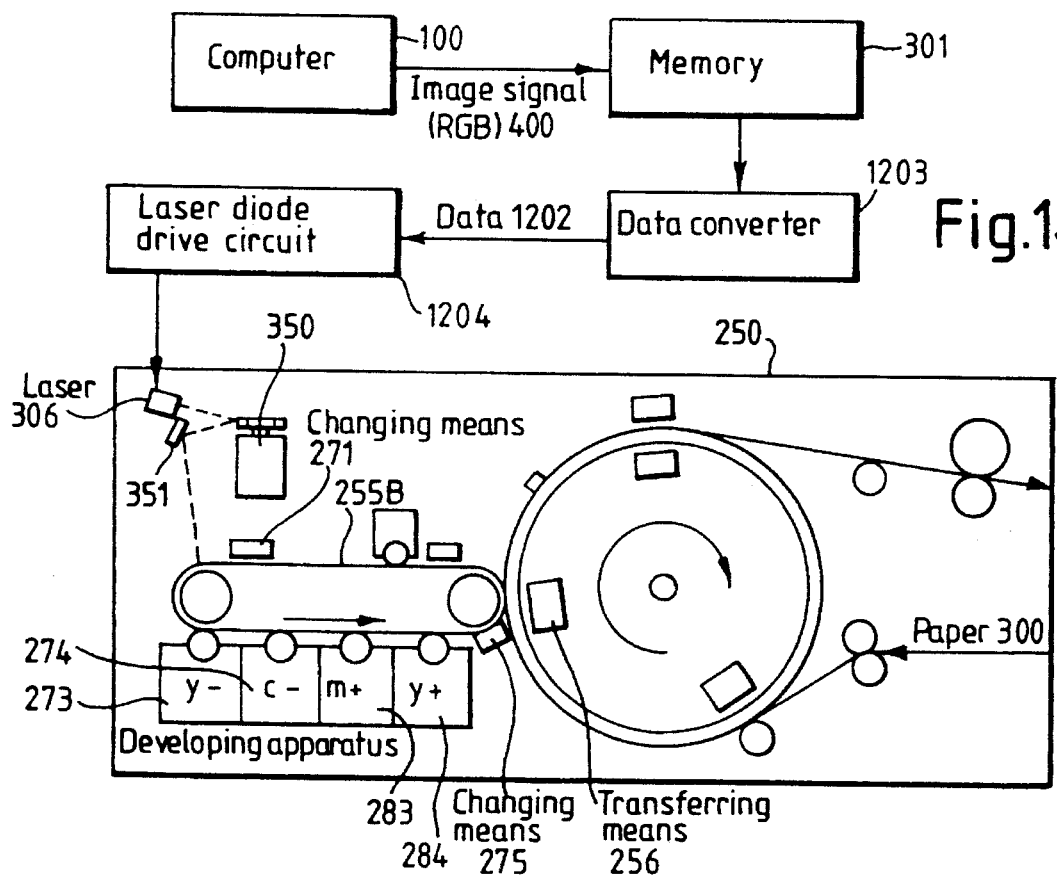
FIG. 14 is a schematic sectional view through a printer unit forming a sixth embodiment of the present invention.
Figure 15:
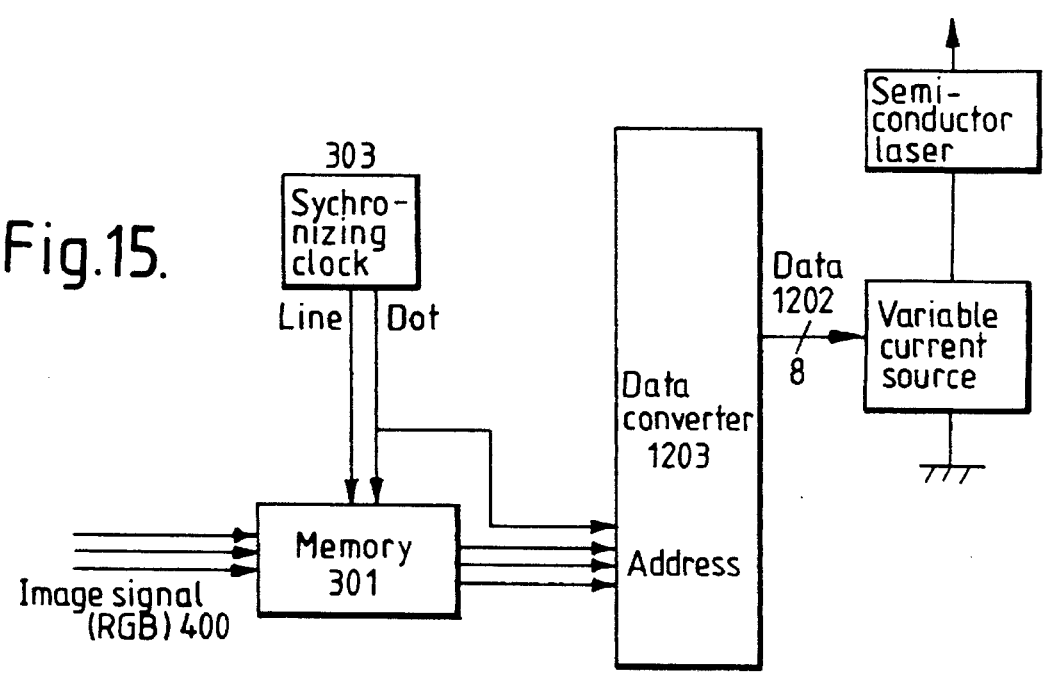
FIG. 15 is a schematic block diagram of a control circuit for the embodiment of FIG. 14.
Figure 16:
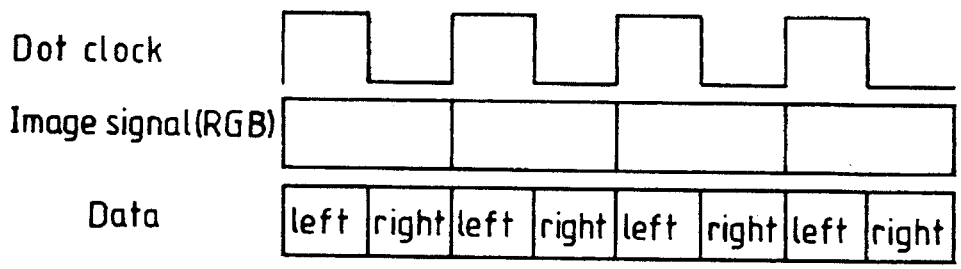
FIG. 16 is a timing diagram of the data converter of the control circuit of FIG. 15.

FIG. 14 through FIG. 16 and Table 3 show another embodiment of this invention.

FIG. 14 shows the overall configuration of this embodiment. Components of this embodiment which correspond to the embodiment of FIG. 3 are indicated by the same reference numerals.

When an RGB image signal for one page of a document is supplied from the computer 100 to the printer 200, the signal is temporarily stored in the memory 301 in the printer control unit 210. As the printer unit 250 starts printing, the image signal is subjected to data conversion by the data convertor 1203 in synchronism with a synchronizing clock 303 and then sent to the laser diode drive circuit 1204. In the printer unit 250, the photosensitive belt 255B is charged by the charger 271, exposed to a beam from the semiconductor laser 306 and then passed through four development processors 273, 274, 283, 284. In this embodiment, the development processors contain color toners and are set at development bias potentials listed below.

(i) Development processor 273: negatively charged yellow toner material, at −200 V;

(ii) Development processor 274: negatively charged cyan toner material, at −400 V;

(iii) Development processor 283: positively charged magenta toner material, at −600 V;

(iv) Development processor 284: positively charged yellow toner material, at −800 V.

The developed toners are charged to the same polarity by the charger 275 and transferred to the paper 300 by the transfer activator 256.

FIG. 15 shows the configuration of a control circuit for controlling the surface potential of the photosensitive body by the laser output. The RGB image signal from the memory 301 is sent, in synchronism with the dot synchronizing clock 303, to the address terminal of the convertor 1203 that has a data memory. A signal from the dot synchronizing clock 303 is also sent directly to the data convertor 1203. Table 3 shows the method of conversion carried out by the data convertor 1203 and FIG. 16 shows a timing chart for the data convertor 1203.

TABLE 3

| | Dot Clock | 1<br>Data for<br>left<br>half | 0<br>Data for<br>right<br>half | Colors<br>produced<br>after<br>fixing |
|---|---|---|---|---|
| Image signal<br>(RGB) | 010 | −100V | −100V | G |
| | 011 | −300V | −300V | C |
| | 100 | −700V | −700V | M |
| | 101 | −900V | −900V | R |
| | 001 | −200V | −800V | B |
| | 110 | N/A | N/A | Y |
| | 000 | −100V | −900V | K |
| | 111 | −500V | −500V | W |

In the above table, the colors are identified as follows:
C: cyan; M: magenta; Y: yellow; R: red; B: blue; K: black.
The symbol N/A means that the data not available Note that the actual data is 8-bit digital data that corresponds to the laser drive current that generates the photosensitive body potential as shown in the table after exposure.

Figure 17:
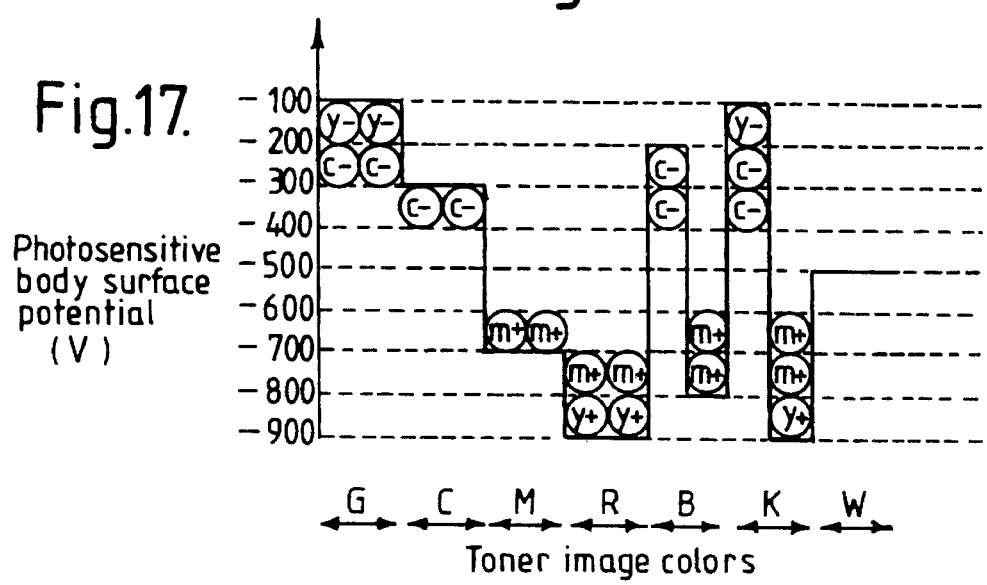
FIG. 17 is a graph showing the relationship between the surface potential of the photosensitive body and the toner colors produced in the embodiment of FIG. 14.

The data convertor 1203 is preset with 8-bit binary data which represent laser drive currents for providing the exposed photosensitive body with potentials as shown in Table 3 after exposure. At the leading edge of the dot clock 303, the image signal 400 is updated. When the dot clock 303 is "1," the data convertor 1203 outputs data 1202 for the left half of the dot 1 When the dot clock 303 is "0," the data convertor 1203 outputs data for the right half of the dot. The variable current source 307 is a high-speed digital-analog convertor which supplies a current corresponding to the data 1202 to the semiconductor laser 306. FIG. 17 shows the relationship between the photosensitive body surface potential and the color toner materials. The photosensitive body surface charged uniformly to a potential of −900 V is exposed by a beam from the semiconductor laser 306 whose intensity corresponds to the color to be produced so that the surface will be charged to seven levels of potential between −100 V and −900 V. Since each development processor is set at the development bias, the color produced toner is described below.

(i) Area with a potential of −100 V: It receives negative C and Y toner materials; The resulting color is green G (=C+Y).

(ii) Area with a potential of −300 V: It receives only negative C toner material; the resulting color is cyan C.

(iii) Area with a potential of −500 V: It receives no toner material; the resulting color is white W.

(iv) Area with a potential of −700 V: It receives only positive M toner material; the resulting color is magenta M.

(v) Area with a potential of −900 V: It receives positive M and Y toner materials; the resulting color is red R (=M+Y).

(vi) Area with a potential of −100 V and −900 V: It receives negative C and Y materials and positive M and Y toner materials; the resulting color is black K (=C+M+Y), using the principle of this invention.

(vii) Area with a potential of −200 V and −900 V: It receives negative C and positive M toner materials; the resulting color is blue B (=C+M) using the principle of this invention.

In this embodiment, although yellow Y cannot be produced, a significantly wide gamut of colors can be produced by suitably changing the proportions of the three color toners contained in the four development processors. Thus, this embodiment can be used for multi-color applications. Since this embodiment produces a multi-color latent image in a single exposure, there is theoretically no registration error between different color images (which error has disadvantageous effects on the image quality) and thus very high quality images can be obtained. Furthermore, the recording speed is improved.

With this invention, a subtractive color process can be performed in a single run of exposure/development, so that many colors can be produced. Hence, by providing two sets of processes or by repeating one set of exposure/development processes twice, it is possible to produce high-quality multi-color full-color images with no positional deviations between different color images and at high speed.

What is claimed is:

1. An electrophotographic color printer, comprising:
    a photosensitive body;
    an exposure system to expose said photosensitive body to form an exposure pattern having a plurality of pixel elements; and
    a developer system to apply first toner material of a first color and second toner material of a second color to respective ones said pixel elements such that first ones of said plurality of pixel elements have a first thickness of said first toner material, second ones of said pixel elements have a second thickness of said first toner material, said third ones of said pixel elements have said first thickness of said second toner material and fourth ones of said pixel elements have said second thickness of said second toner material.

2. A printer according to claim 1, wherein said first, second, third and fourth ones of said plurality of pixel elements have respectively different voltage levels.

3. A printer according to claim 1, wherein said exposure system is arranged to form said plurality of pixel elements such that said first and third ones of said plurality of pixel elements have a first width and said second and fourth ones of said plurality of pixel elements have a second width.

4. A printer according to claim 1, having a transfer arrangement to transfer said first and second toner materials to a recording medium.

5. A printer according to claim 4, having a further photosensitive body, a further exposure system to expose said further photosensitive body to form a further exposure pattern on said further photosensitive body, said further exposure pattern having a plurality of further pixel elements, a further developer system arranged to apply third toner material of a third color and fourth toner material of a fourth color to first and second ones of said plurality of further pixel elements, and a further transfer arrangement to transfer said third and fourth toner materials to said recording medium.

6. A printer according to claim 5, wherein said transfer arrangement and said further transfer arrangement transfer said first, second, third and fourth toner materials to said recording medium such that at least some of said third toner material is coincident with at least some of said first and second toner material on said recording medium.

7. A printer according to claim 1, wherein said exposure system is arranged to expose said photosensitive body to form a further exposure pattern having a plurality of further pixel elements, and said developer system is arranged to apply third toner material of a third color and fourth toner material of a fourth color to first and second ones of said plurality of further pixel elements.

8. A printer according to claim 7, having a transfer arrangement to transfer first and second toner materials to a recording medium and for subsequently transferring said third and fourth toner materials to said recording medium.

9. A printer according to claim 8, wherein said transfer arrangement transfers said first, second, third and fourth toner materials to said recording medium such that at least some of said third toner material is coincident with at least some of said first and second toner material on said recording medium.

10. A printer according to claim 1, having further exposure system for exposing said photosensitive body to form a further exposure pattern thereon, said further exposure pattern having a plurality of further pixel elements, and a further developer system arranged to apply third toner material of a third color and fourth toner material of a fourth color to first and second ones of said plurality of pixel elements.

11. A printer according to claim 10, having a transfer arrangement to simultaneously transfer said first, second, third and fourth toner materials simultaneously from said photosensitive body to a recording medium.

12. A printer according to claim 10, wherein at least some of said first ones of said plurality of further pixel elements coincide with at least some of said first and second ones of said plurality of pixel elements on said photosensitive body.

13. A printer according to claim 1, wherein said developer system is arranged to apply third toner material of a third color to at least some of said first and second ones of said plurality of pixel elements.

14. A printer according to claim 13, wherein said developer system is arranged to apply said third toner material to at least some of said third and fourth ones of said plurality of pixel elements.

15. An electrophotographic color printer, comprising:
    a photosensitive body;
    exposure means for exposing said photosensitive body, said exposure means being arranged to expose said photosensitive body such as to form an exposure pattern on said photosensitive body, said exposure pattern having a plurality of voltage levels, said plurality of voltage levels comprising a background voltage level, a first voltage level being positive relative to said background voltage level, a second voltage level being positive relative to both said first voltage level and said background level, a third voltage level being negative relative to said background level voltage, and fourth voltage level being negative relative to both said third voltage level and said background level voltage; and
    developer means for applying first toner material of a first color to said first and second voltage levels of said exposure pattern and second toner material of a second color to said third and fourth voltage levels.

16. A printer according to claim 15, wherein said plurality of voltage levels include a fifth voltage level being positive relative to all of said first, second and background levels and a sixth voltage level being negative relative to all of said third, fourth and background levels, and said developer means is arranged to apply third toner material of a third color and said first toner material to said fifth voltage levels and to apply said third toner material and said second toner material to said sixth voltage level.

17. An electrophotographic color printer comprising:
    first and second photosensitive bodies;
    first and second exposure means for respectively exposing said first and second photosensitive bodies to form first and second latent images, respectively;
    first and second developer means associated with said first photosensitive body, said first developer means including a first toner material having a first toner layer and being arranged to apply said first toner material of a first color for said first latent image to said first photosensitive body on the basis of said exposure by said first exposure means, said second developer means including a second toner material having a polarity reverse to a polarity of said first toner material and a second toner layer of a thickness greater than a thickness of said first toner layer and being arranged to apply said second toner material of a second color for said first latent image to said first photosensitive body on the basis of said exposure by said first exposure means, said second developer means developing said first latent image which is exposed by said first exposure means on said first photosensitive body;

third and fourth developer means associated with said second photosensitive body for forming a second latent image, said third developer means including a third toner material having a third toner layer and being arranged to apply said third toner material of a third color for said second latent image to said second photosensitive body on the basis of said exposure by said second exposure means, said fourth developer means including a fourth toner material having a polarity reverse to a polarity of said third toner material and a fourth toner layer of a thickness greater than a thickness of said third toner layer and being arranged to apply said fourth toner material of a fourth color for said second latent image to said second photosensitive body on the basis of said exposure by said second exposure means, said fourth developer means developing said second latent image which is exposed by said second exposure means on said second photosensitive body; and transfer means for transferring said first and second latent images sequentially to a recording medium.

18. An electrophotographic color printer comprising:

a photosensitive body;

exposure means for exposing said photosensitive body to form a first latent image thereon and for subsequently exposing further said photosensitive body to form a second latent image thereon;

first and second developer means associated with said photosensitive body, said first and second developer means being arranged respectively to apply first toner material of a first color and second toner material of a second color for said first latent image to said photosensitive body;

transfer means for transferring said first and second toner materials to a recording medium prior to the forming of said second latent image by said exposure means; and third and fourth developer means associated with said photosensitive body, said third and fourth developer means being arranged respectively to apply third toner material of a third color and fourth toner material of a fourth color for said second latent image to said photosensitive body;

wherein said transfer means is arranged to transfer said third and fourth toner material to said recording medium.

19. An electrophotographic color printer comprising:

a photosensitive body;

first exposure means for exposing said photosensitive body to form a first latent image thereon:

first and second developer means associated with said photosensitive body, said first and second developer means being arranged respectively to apply first toner material of a first color and second toner material of a second color for said first latent image to said photosensitive body, said first developer means including said first toner material having a first toner image, said second developer means including said second toner material having a polarity reverse to a polarity of such first toner material and a second toner layer of a thickness greater than a thickness of said first toner layer, said second developer means developing said first latent image which is exposed by said first exposure means on said photosensitive body;

second exposure means for exposing further said photosensitive body to form a second latent image thereon;

third and fourth developer means associated with said photosensitive body, said third and fourth developer means being arranged respectively to apply third toner material of a third color and fourth toner material of a fourth color for said second latent image to said photosensitive body, said third developer means including said third toner material having a third toner layer, said fourth developer means including said fourth toner material having a polarity reverse to a polarity of said third toner material and a fourth toner layer having a thickness greater than a thickness of said third toner layer, said fourth developer means developing said second latent image which is exposed by said second exposure means on said photosensitive body;

transfer means for simultaneously transferring said first, second, third and fourth toner materials to a recording medium.

20. A printer according to claim 19, wherein said first and second exposure means have a common light source.

21. A printer according to claim 19, wherein said first and second exposure means have separate light sources, and a common beam scanning means.

22. A printer according to claim 19, wherein the printer comprises a light amount varying means for varying a light amount of a laser beam, a polarization angle varying means for varying a polarization angle, and a dividing means for dividing the laser beam toward two directions according to said polarization angle.

23. A printer according to claim 19, wherein the printer comprises a comprising means for composing two laser beam lights to one laser beam light, and a dividing means for dividing the one laser beam light toward two directions according to said polarization angle.

24. A method of electrophotographic color printing, comprising:

exposing a photosensitive body to form an exposure pattern having a plurality of pixel elements; and applying first toner material of a first color and second toner material of a second color to respective ones said pixel elements such that first ones of said pixel elements have a first thickness of said first toner material, second ones of said pixel elements have a second thickness of said first toner material, third ones of said pixel elements have said first thickness of said second toner material and fourth ones of said pixel elements have said second thickness of said second toner material.

25. A method of electrophotographic color printing, comprising:

exposing a photosensitive body so as to form an exposure pattern on said photosensitive body, said exposure pattern having a plurality of voltage levels, said plurality of voltage levels comprising a background voltage level, a first voltage level being positive relative to said background voltage level, a second voltage level being negative relative to both said first voltage level and said background level voltage, a third voltage level being negative relative to said background level voltage, and fourth voltage level being negative relative to both said third voltage level and said background level voltage; and applying first toner material of a first color to said first and second voltage levels of said exposure pattern and second toner material of a second color to said third and fourth voltage levels.

26. A method of electrophotographic color printing comprising the steps of:

exposing first and second photosensitive bodies to first and second exposures to form first and second latent images, respectively;

applying by a first developer means first toner material of a first color for said first latent image to said first photosensitive body on the basis of said first exposure, said first toner material including a first toner layer;

applying by a second developer means second toner material of a second color for said first latent image to said first photosensitive body on the basis of said first exposure, said second toner material having a polarity reverse to a polarity of said first toner material and a second toner layer of a thickness greater than a thickness of said first toner layer, said second developer means developing said first latent image which is exposed by said first exposure on said first photosensitive body;

applying by a third developer means a third toner material of a third color for said second latent image to said second photosensitive body on the basis of said second exposure, said third toner material including a third toner layer;

applying by a fourth developer means a fourth toner material of a fourth color for said second latent image to said second photosensitive body on the basis of said second exposure, said fourth toner material having a polarity reverse to a polarity of said third toner material and a fourth toner layer having a thickness greater than a thickness of said third toner layer, said fourth developer developing said second latent image which is exposed by said second exposure on said second photosensitive body; and transferring said first and second latent images sequentially to a recording medium.

27. A method of electrophotographic color printing comprising the steps of:

exposing a photosensitive body by exposure means to form a first latent image thereon and subsequently exposing further said photosensitive body to form a second latent image thereon;

applying first toner material of a first color by a first developer means and second toner material of a second color by a second developer means for said first latent image to said photosensitive body, said first toner material having a first toner layer, said second toner material having a polarity reverse to a polarity of said first toner material and a second toner layer of a thickness greater than a thickness of said first toner layer, said second developer means developing said first latent image which is exposed by said exposure means on said photosensitive body;

transferring said first and second toner materials to a recording medium prior to the forming of said second latent image by said exposure means;

applying third toner material of a third color by a third developer means and fourth toner material of a fourth color by a fourth developer means for said second latent image to said photosensitive body, said third toner material having a third toner layer, said fourth toner material having a polarity reverse to a polarity of said third toner material and a fourth toner layer of a thickness greater than a thickness of said third toner layer, said fourth developer means developing said second latent image which is exposed by said exposure means on said photosensitive body; and transferring said third and fourth toner materials to said recording medium.

28. A method of electrophotographic color printing comprising the steps of:

exposing a photosensitive body by exposure means to form a first latent image thereon;

applying first toner material of a first color by a first developer means and second toner material of a second color by a second developer means for said first latent image to said photosensitive body, said first toner material having a first toner layer, said second toner material having a polarity reverse to a polarity of said first toner material and a second toner layer of a thickness greater than a thickness of said first toner layer, said second developer means developing said first latent image which is exposed by said exposure means on said photosensitive body;

exposing further said photosensitive body to form a second latent image thereon;

applying a third toner material of a third color by a third developer means and fourth toner material of a fourth color by a fourth developer means for said second latent image to said photosensitive body, said third toner material having a third toner layer, said fourth toner material having a polarity reverse to a polarity of said third toner material and a fourth toner layer of a thickness greater than a thickness of said third toner layer, said fourth developer means developing said second latent image which is exposed by said exposure means on said photosensitive body; and simultaneously transferring said first, second, third and fourth toner materials to a recording medium.

29. An electrophotographic color printer, comprising:

a photosensitive body;

an exposure system to expose said photosensitive body to form an exposure pattern of at least a first latent image; and a developer system to apply first toner material of a first color and second toner material of a second color to predetermined portions of said exposure pattern;

wherein at least one of said exposure system and said developer system includes at least one of (a) means for forming the exposure pattern with a plurality of voltage levels, said plurality of voltage levels including a background voltage level, a first voltage level being positive relative to said background voltage level, a second voltage level being positive relative to both said first voltage level and said background level, a third voltage level being negative relative to said background level voltage, and a fourth voltage level being negative relative to both said third voltage level and said background level voltage, and means for applying said first toner material of a first color to said first and second voltage levels of said exposure pattern and second toner material of a second color to said third and fourth voltage levels; (b) means for exposing said photosensitive body to form the exposure pattern with a plurality of pixel elements, and means for applying said first toner material of said first color and said second toner material of said second color to respective ones of said pixel elements such that first ones of said plurality of pixel elements have a first thickness of said first toner material, second ones of said pixel elements have a second thickness of said first toner material, third ones of said pixel elements have said first thickness of said second toner material and fourth ones of said pixel elements have said second thickness of said second toner material; and (c) means for subsequently exposing said photosensitive body to form a second latent image thereon, and means associated with said photosensitive body and arranged to apply said first toner material of the first color and said second toner material of the second color for the first latent image to said photosensitive body.

* * * * *